United States Patent
Abraham et al.

(10) Patent No.: US 12,472,100 B2
(45) Date of Patent: Nov. 18, 2025

(54) MANAGING LASER SHOT FREQUENCY FOR AN OPHTHALMIC SURGICAL SYSTEM

(71) Applicant: Alcon Inc., Fribourg (CH)

(72) Inventors: Mario Abraham, Burgthann (DE); Michael Wittnebel, Hirschaid (DE)

(73) Assignee: ALCON INC., Fribourg (CH)

( * ) Notice: Subject to any disclaimer, the term of this patent is extended or adjusted under 35 U.S.C. 154(b) by 613 days.

(21) Appl. No.: 17/823,322

(22) Filed: Aug. 30, 2022

(65) Prior Publication Data
US 2023/0083360 A1   Mar. 16, 2023

Related U.S. Application Data (60) Provisional application No. 63/240,104, filed on Sep. 2, 2021.

(51) Int. Cl.
*A61F 9/008* (2006.01)

(52) U.S. Cl.
CPC .... *A61F 9/008* (2013.01); *A61F 2009/00844* (2013.01); *A61F 2009/00897* (2013.01)

(58) Field of Classification Search
CPC ............ A61F 9/008; A61F 2009/00844; A61F 2009/00846; A61F 2009/00857; A61F 2009/00878; A61F 2009/00897
See application file for complete search history.

(56) References Cited

U.S. PATENT DOCUMENTS

| | | | |
|---|---|---|---|
| 6,090,100 A * | 7/2000 | Hohla | A61F 9/00804 606/5 |
| 2006/0247608 A1* | 11/2006 | Hahn | A61F 9/008 606/5 |
| 2007/0161972 A1 | 7/2007 | Felberg et al. | |
| 2008/0234667 A1* | 9/2008 | Lang | A61F 9/00802 606/4 |
| 2009/0264874 A1* | 10/2009 | Hegels | A61F 9/008 606/5 |
| 2011/0276043 A1* | 11/2011 | Youssefi | A61F 9/00806 606/5 |
| 2012/0078240 A1 | 3/2012 | Spooner | |
| 2018/0042771 A1 | 2/2018 | Logan et al. | |

FOREIGN PATENT DOCUMENTS

| | | |
|---|---|---|
| EP | 1649843 A1 | 4/2006 |
| WO | 03101326 A1 | 12/2003 |

* cited by examiner

*Primary Examiner* — Allen Porter (57) ABSTRACT

An ophthalmic surgical system for treating an eye comprises a laser device and computer. The laser device directs laser pulses at a treatment frequency towards the eye according to a shot list, which comprises a sequence of laser shots and corresponding locations. The sequence of laser shots comprises substrings, where each substring indicates a local shot frequency at a location. The number of laser shots in a substring depends on the treatment frequency. The computer performs the following for the substrings: if there is a change in the treatment frequency, adjust the number of laser shots in a substring; check whether the substring indicates that a local shot frequency satisfies a maximum local frequency at the treatment frequency; and if the local shot frequency fails to satisfy the maximum local frequency, adjust the shot list such that the local shot frequency satisfies the maximum local frequency.

21 Claims, 4 Drawing Sheets

MANAGING LASER SHOT FREQUENCY FOR AN OPHTHALMIC SURGICAL SYSTEM

TECHNICAL FIELD

The present disclosure relates generally to ophthalmic surgical systems, and more particularly to managing laser shot frequency for an ophthalmic surgical system.

BACKGROUND

Laser photoablation, or laser ablation, is the process of removing material from a surface by irradiating it with a laser beam. In ophthalmic surgery, an ablation procedure typically uses laser pulses to reshape the cornea to change its refractive properties. The laser pulses are directed towards the cornea according to a laser shot pattern. The pulses forces molecules to detach from each other, and material is removed to yield a desired corneal shape.

As the laser pulses hit a location of the eye, they increase the temperature at the location. If the temperature exceeds a damage threshold, the eye may suffer temporary or permanent damage. Accordingly, a maximum local frequency limits the local frequency of laser pulses.

BRIEF SUMMARY

In certain embodiments, an ophthalmic surgical system for treating an eye comprises a laser device and a computer. The laser device directs laser pulses emitted at a treatment frequency towards the eye according to a shot list. The shot list comprises a sequence of laser shots and their corresponding locations. The sequence of laser shots comprises substrings, where each substring indicates a local shot frequency at a location of a plurality of locations. The number of laser shots in a substring depends on the treatment frequency. The computer performs the following for the substrings: if there is a change in the treatment frequency, adjust the number of laser shots in a substring; check whether the substring indicates that a local shot frequency satisfies a maximum local frequency at the treatment frequency, where the maximum local frequency limits a frequency of shots at a location; and if the local shot frequency fails to satisfy the maximum local frequency at the treatment frequency, adjust the shot list such that the local shot frequency satisfies the maximum local frequency at the treatment frequency.

Embodiments may include none, one, some, or all of the following features:

The computer checks whether the sub string indicates that a local shot frequency satisfies a maximum local frequency at the treatment frequency by: determining whether overlapping laser shots of the substring are allowable; and if the overlapping laser shots are allowable, determining that the local shot frequency satisfies the maximum local frequency at the treatment frequency. The overlapping laser shots may be allowable if a maximum energy of a combined energy of the overlapping laser shots is less than a maximum energy of an energy of a laser shot of the overlapping laser shots.

The computer adjusts the shot list such that the local shot frequency satisfies the maximum local frequency at the treatment frequency by: identifying a laser shot that causes the local shot frequency to fail to satisfy the maximum local frequency; and shifting the laser shot to a later slot of the sequence until the local shot frequency satisfies the maximum local frequency. The computer may shift the laser shot to a later slot by repeating the following until the local shot frequency satisfies the maximum local frequency: shift the laser shot to the next slot of the sequence; and check whether the local shot frequency satisfies the maximum local frequency.

The computer adjusts the shot list such that the local shot frequency satisfies the maximum local frequency at the treatment frequency by: identifying a laser shot that causes the local shot frequency to fail to satisfy the maximum local frequency; and suspending the laser shot until the local shot frequency satisfies the maximum local frequency. The computer may suspend the laser shot to the next allowed slot.

The computer adjusts the shot list such that the local shot frequency satisfies the maximum local frequency at the treatment frequency by identifying a laser shot that causes the local shot frequency to fail to satisfy the maximum local frequency and shifting or suspending the laser shot to a later slot of the sequence until the local shot frequency satisfies the maximum local frequency. For example, the computer may shift or suspend the laser shot by shifting the laser shot for a lower treatment frequency and suspending the laser shot for a higher treatment frequency. As another example, the computer may shift or suspend the laser shot by shifting the laser shot for a higher treatment frequency and suspending the laser shot for a lower treatment frequency. As yet another example, the computer may shift or suspend the laser shot by shifting the laser shot to a later slot of the substring and suspending the laser shot until the local shot frequency satisfies the maximum local frequency. As yet another example, the computer may shift or suspend the laser shot by suspending the laser shot until a later slot of the substring and shifting the laser shot until the local shot frequency satisfies the maximum local frequency.

The ophthalmic surgical system includes a camera that records images of the eye to monitor the treatment of the eye.

In certain embodiments, a method for treating an eye includes directing at a treatment frequency, by a laser device, laser pulses towards the eye according to a shot list, which comprises a sequence of laser shots and their corresponding locations. The sequence of laser shots comprises substrings, where each substring indicates a local shot frequency at a location. The number of laser shots in a substring depends on the treatment frequency. The following are performed by a computer for the substrings: if there is a change in the treatment frequency, adjusting the number of laser shots in a substring; checking whether the substring indicates that a local shot frequency satisfies a maximum local frequency at the treatment frequency, the maximum local frequency limiting a frequency of shots at a location; and if the local shot frequency fails to satisfy the maximum local frequency at the treatment frequency, adjusting the shot list such that the local shot frequency satisfies the maximum local frequency at the treatment frequency.

Embodiments may include none, one, some, or all of the following features:

Checking whether the substring indicates that a local shot frequency satisfies a maximum local frequency at the treatment frequency further comprises: determining whether a plurality of overlapping laser shots of the sub string are allowable; and if the overlapping laser shots are allowable, determining that the local shot frequency satisfies the maximum local frequency at the treatment frequency. The overlapping laser shots may be allowable if a maximum energy of a combined energy of the overlapping laser shots is less than a maximum energy of an energy of a laser shot of the overlapping laser shots.

Adjusting the shot list further comprises identifying a laser shot that causes the local shot frequency to fail to satisfy the maximum local frequency and shifting the laser shot to a later slot of the sequence until the local shot frequency satisfies the maximum local frequency. The laser shot may be shifted by repeating the following until the local shot frequency satisfies the maximum local frequency: shifting the laser shot to a next slot of the sequence; and checking whether the local shot frequency satisfies the maximum local frequency.

Adjusting the shot list further comprises identifying a laser shot that causes the local shot frequency to fail to satisfy the maximum local frequency and suspending the laser shot until the local shot frequency satisfies the maximum local frequency. The laser shot may be suspended to the next allowed slot.

Adjusting the shot list further comprises identifying a laser shot that causes the local shot frequency to fail to satisfy the maximum local frequency and shifting or suspending the laser shot to a later slot of the sequence until the local shot frequency satisfies the maximum local frequency. For example, the computer may shift or suspend the laser shot by shifting the laser shot for a lower treatment frequency and suspending the laser shot for a higher treatment frequency. As another example, the computer may shift or suspend the laser shot by shifting the laser shot for a higher treatment frequency and suspending the laser shot for a lower treatment frequency. As yet another example, the computer may shift or suspend the laser shot by shifting the laser shot to a later slot of the substring and suspending the laser shot until the local shot frequency satisfies the maximum local frequency. As yet another example, the computer may shift or suspend the laser shot by suspending the laser shot until a later slot of the substring and shifting the laser shot until the local shot frequency satisfies the maximum local frequency.

In certain embodiments, an ophthalmic surgical system for treating an eye comprises a laser device and a computer. The laser device directs laser pulses emitted at a treatment frequency towards the eye according to a shot list. The shot list comprises a sequence of laser shots and their corresponding locations. The sequence of laser shots comprises substrings, where each substring indicates a local shot frequency at a location of a plurality of locations. The number of laser shots in a substring depends on the treatment frequency. The computer performs the following for the substrings: if there is a change in the treatment frequency, adjust the number of laser shots in a substring; check whether the substring indicates that a local shot frequency satisfies a maximum local frequency at the treatment frequency, where the maximum local frequency limits a frequency of shots at a location; and if the local shot frequency fails to satisfy the maximum local frequency at the treatment frequency, adjust the shot list such that the local shot frequency satisfies the maximum local frequency at the treatment frequency. The computer checks whether the substring indicates that a local shot frequency satisfies a maximum local frequency at the treatment frequency by: determining whether overlapping laser shots of the substring are allowable; and if the overlapping laser shots are allowable, determining that the local shot frequency satisfies the maximum local frequency at the treatment frequency. The overlapping laser shots are allowable if a maximum energy of a combined energy of the overlapping laser shots is less than a maximum energy of an energy of a laser shot of the overlapping laser shots. The computer adjusts the shot list by: (1) identifying a laser shot that causes the local shot frequency to fail to satisfy the maximum local frequency and shifting the laser shot to a later slot of the sequence by repeating the following until the local shot frequency satisfies the maximum local frequency: shift the laser shot to the next slot of the sequence and check whether the local shot frequency satisfies the maximum local frequency; (2) identifying a laser shot that causes the local shot frequency to fail to satisfy the maximum local frequency and suspending the laser shot to the next allowed slot until the local shot frequency satisfies the maximum local frequency; or (3) identifying a laser shot that causes the local shot frequency to fail to satisfy the maximum local frequency and shifting or suspending the laser shot to a later slot of the sequence until the local shot frequency satisfies the maximum local frequency. The computer may shift or suspend the laser shot by: (1) shifting the laser shot for a lower treatment frequency and suspending the laser shot for a higher treatment frequency; (2) shifting the laser shot for a higher treatment frequency and suspending the laser shot for a lower treatment frequency; (3) shifting the laser shot to a later slot of the substring and suspending the laser shot until the local shot frequency satisfies the maximum local frequency; and (4) suspending the laser shot until a later slot of the substring and shifting the laser shot until the local shot frequency satisfies the maximum local frequency.

DESCRIPTION OF EXAMPLE EMBODIMENTS

Referring now to the description and drawings, example embodiments of the disclosed apparatuses, systems, and methods are shown in detail. The description and drawings are not intended to be exhaustive or otherwise limit the claims to the specific embodiments shown in the drawings and disclosed in the description. Although the drawings represent possible embodiments, the drawings are not necessarily to scale and certain features may be simplified, exaggerated, removed, or partially sectioned to better illustrate the embodiments.

Ophthalmic laser surgical systems direct laser shots (as pulses) towards the eye according to a laser shot list. The shot list describes laser shots and their corresponding locations, so can be used to determine the local frequency of laser shots at a particular location. Accordingly, the shot list can be used to maintain the local frequency of laser shots under a maximum local frequency in order to avoid tissue damage.

In certain embodiments, an ophthalmic laser surgical system checks whether a laser shot list satisfies the maximum local frequency at specific treatment frequencies. Moreover, the surgical system checks whether the laser shot list satisfies the maximum local frequency in response to a change in treatment frequencies. Accordingly, the surgical system can be used with varying treatment frequencies.

Figure 1:
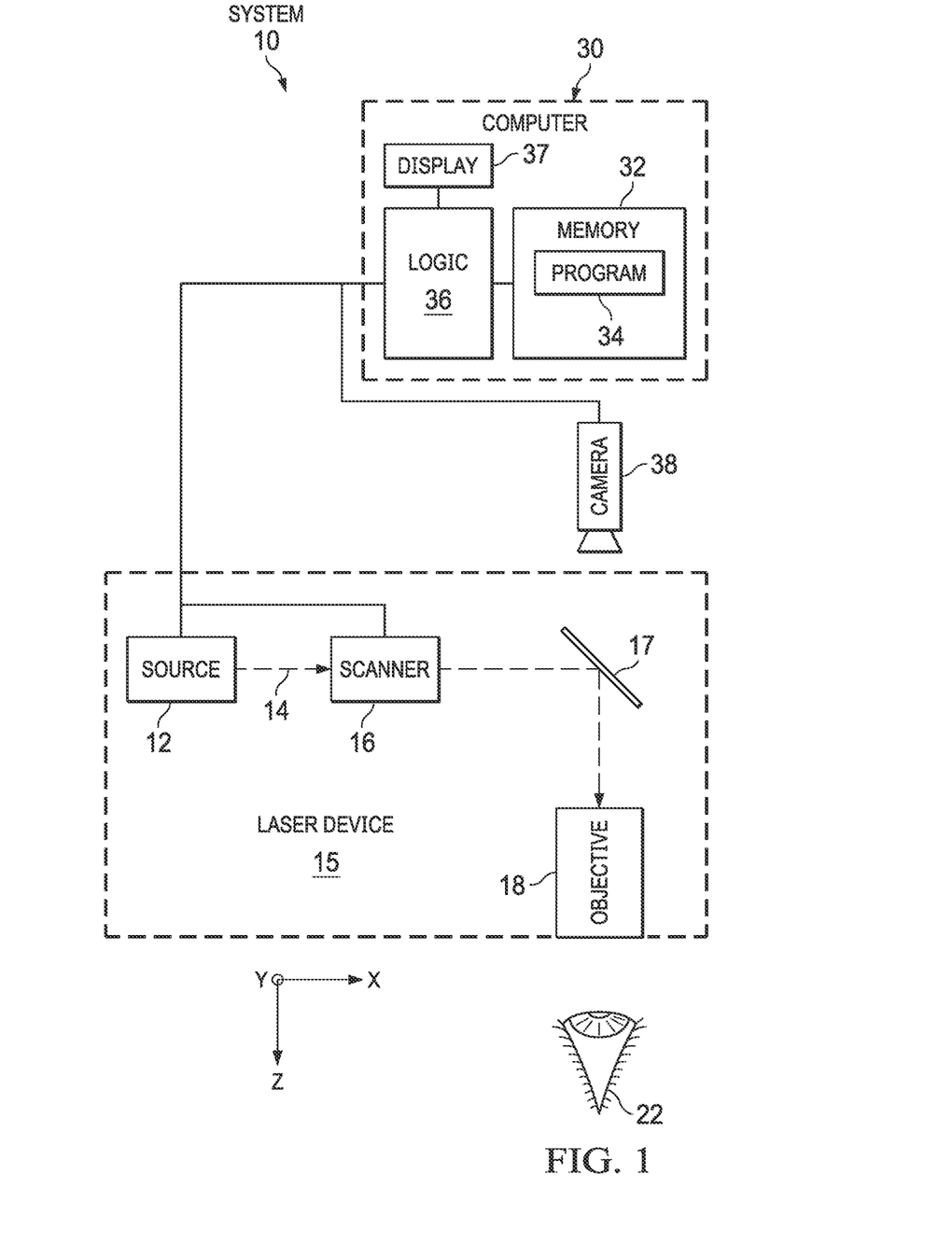
FIG. 1 illustrates an example of an ophthalmic laser ablation system that ablates the corneal tissue of eye, according to certain embodiments.

FIG. 1 illustrates an example of an ophthalmic laser ablation system 10 that ablates the corneal tissue of eye 22, according to certain embodiments. In the illustrated example, system 10 includes a laser device 15, a camera 38, and a control computer 30, coupled as shown. Laser device 15 includes controllable components, such as a laser source 12, a scanner 16, one or more optical elements 17, and/or a focusing objective 18, coupled as shown. Computer 30 includes logic 36, a memory 32 (which stores a computer program 34), and a display 37, coupled as shown. For ease of explanation, the following xyz-coordinate system is used: The z-direction is defined by the propagation direction of the laser beam, and the xy-plane is orthogonal to the propagation direction. Other suitable xyz-coordinate systems may be used.

As an overview, laser device 15 directs laser pulses towards an eye according to a shot list. Computer 30 checks the substrings of the shot list to determine whether the local shot frequencies satisfy a maximum local frequency at the treatment frequency, where the maximum local frequency limits a frequency of shots at a location. If a local shot frequency fails to satisfy the maximum local frequency at the treatment frequency, computer 30 adjusts the shot list such that the local shot frequency satisfies the maximum local frequency. There may be a change in the treatment frequency. In response to the change, computer 30 changes the number of laser shots in the substrings of the remaining sequence of laser shots. Computer 30 checks the remaining substrings to determine whether the local shot frequencies satisfy the maximum local frequency at the new treatment frequency. Computer 30 adjusts the shot list if the maximum local frequency is not satisfied.

Turning to the parts of system 10, laser source 12 generates a laser beam comprising laser pulses that ablate tissue of eye 22 according to a laser shot list. Laser source 12 may be an excimer, solid-state, or other suitable laser, and may emit a laser beam with an ultraviolet wavelength. A laser shot list defines x and y coordinates of locations at which laser shots (or laser pulses) are to be directed, and the order in which the shots (or pulses) are to be directed. The laser shot list may be determined from an ablation profile, which indicates the volume of tissue to be removed at particular x, y locations of the cornea. Given the volume of tissue ablated per pulse, the number of shots to be directed at an x, y location can be calculated from the volume of tissue defined by the ablation profile.

Scanner 16 laterally directs the focal point of the laser beam. The lateral direction refers to directions orthogonal to the direction of beam propagation, i.e., the x, y directions. Scanner 16 may laterally direct the laser beam in any suitable manner. For example, scanner 16 may include a pair of galvanometrically-actuated scanner mirrors that can be tilted about mutually perpendicular axes. As another example, scanner 16 may include an electro-optical crystal that can electro-optically steer the laser beam.

One (or more) optical elements 17 direct the laser beam towards focusing objective 18. An optical element 17 can act on (e.g., transmit, reflect, refract, diffract, collimate, condition, shape, focus, modulate, and/or otherwise act on) a laser beam. Examples of optical elements include a lens, prism, mirror, diffractive optical element (DOE), holographic optical element (HOE), and spatial light modulator (SLM). In the example, optical element 17 is a mirror. Focusing objective 18 focuses the focal point of laser beam towards a point of eye 22. In the example, focusing objective 18 is an objective lens.

Camera 38 records images of the eye 22. Examples of camera 38 include a video, an optical coherence tomography, or an eye-tracking camera. Camera 38 delivers image data, which represent recorded images of the eye 22, to computer 30. Computer 30 may carry out image processing on the image data to monitor ablation of eye 22. In certain embodiments, images recorded by camera 38 may be used to monitor the current shot frequency and the current overlapping of pulses.

Computer 30 controls components of system 10 in accordance with computer program 34. For example, computer 30 controls components (e.g., laser source 12, scanner 16, optical elements 17, and/or focusing objective 18) to focus the laser beam of laser device 15 at eye 22 and to ablate at least a portion of eye 22 according to an ablation profile. In certain embodiments, computer 30 generates a laser shot list corresponding to the ablation profile. Computer 30 may generate a laser shot list by determining the focal spots corresponding to the tissue removed according to the ablation profile.

A maximum local frequency M limits the local frequency of laser shots at a location of the eye, as the pulses may increase the local temperature of the eye. Exceeding the maximum local frequency may lead to the tissue temperature exceeding a damage threshold, which may cause temporary or permanent damage to the patient. The maximum local frequency M may have any suitable value that avoids damage to the patient. In certain embodiments, technical standards may set the thresholds. For example, the damage threshold may be 43° C., set by IEC 60601-1, which may be satisfied by a maximum local frequency M of, e.g., 40 Hz.

Completely or partially overlapping shots may increase the local temperature at a location, so shots need not have the same (x, y) location to exceed the maximum local frequency. The acceptable (x, y) distances between shots may be determined in accordance with the laser spot size and corresponding area of ablation resulting from a single shot, as well as the energy profile of the pulses. The energy may have any suitable profile, e.g., a Gaussian, super-Gaussian, Lorentz, Voigt, or a top hat (flat-top) profile.

The shot list can be used to check compliance with maximum local frequency M. The shot list comprises a sequence of laser shots and their corresponding locations. The sequence of laser shots comprises substrings that include of a specific number n of laser shots in order of the sequence. In general, a sub string consists of a consecutive run of elements from a sequence. Computer 30 builds a substring to check whether a local shot frequency fi at a particular location L satisfies a maximum local frequency M.

The number n of laser shots of a substring depends on the treatment frequency F. If the treatment frequency F is higher, then more laser shots are likely to strike a location L during a period of time. Accordingly, more laser shots need to be considered when checking whether a local shot frequency fi satisfies a maximum local frequency M, so the larger the number n of laser shots of a substring. For example, for a 200 Hz treatment frequency, a substring has five shots, and for a 500 Hz treatment frequency, a substring has 13 shots. In general, treatment frequency F divided by number n of laser shots of a substring should be generally less than maximum local frequency M, or $F/n<M$.

In some situations, the treatment frequency may change, e.g., from $F_1$ to $F_2$, in the middle of a substring. For example, a substring for a treatment frequency $F_1$=200 Hz has five shots. The treatment frequency, however, may change to $F_2=500$ Hz at, e.g., the fourth shot.

To do this, the endpoint of the substring is determined to be the time at which the substring would have ended if the treatment frequency remained at $F_1$. The shots at treatment frequency $F_2$ fill in the rest of the substring to the endpoint time. Continuing with the example, the first three shots of the substring include shots for treatment frequency $F_1=200$ Hz. If the treatment frequency remained at $F_1$, the substring would have ended 25 ms after the first shot. Accordingly, the shots at treatment frequency $F_2$ fill in the rest of the substring up to 25 ms after the first shot to complete the substring.

In other embodiments, computer 30 may limit a substring to a single treatment frequency. If the treatment frequency changes before the substring is filled, the substring is deemed to be completed. Another substring is built for the next treatment frequency.

Figure 2:
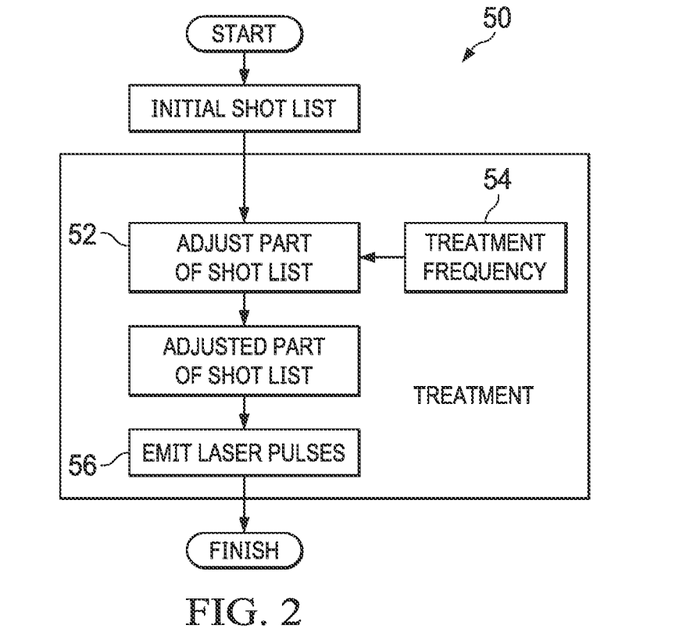
FIG. 2 illustrates an overview of an example of a method for adjusting a shot list for an ophthalmic surgical procedure that may be used by the system of FIG. 1.

FIG. 2 illustrates an overview 50 of an example of a method for adjusting a shot list for an ophthalmic surgical procedure that may be used by system 10 of FIG. 1, according to certain embodiments. In certain embodiments, computer 30 of system 10 may perform certain steps of the method.

In the example, computer 30 receives an initial laser shot list at step 50 and adjusts part of the shot list. In the adjusted part, the local shot frequency satisfies the maximum local frequency at the treatment frequency. The treatment frequency may be determined at step 54 from, e.g., laser device 15 or a device that measures the treatment frequency. Computer 30 sends the adjusted part to laser device 15, which emits the laser shots according to the adjusted part at step 56. The method then ends.

Computer 30 adjusts the shot list in any suitable manner, such as by performing one, two, or three of the following techniques for satisfying the maximum local frequency.

Figure 3:
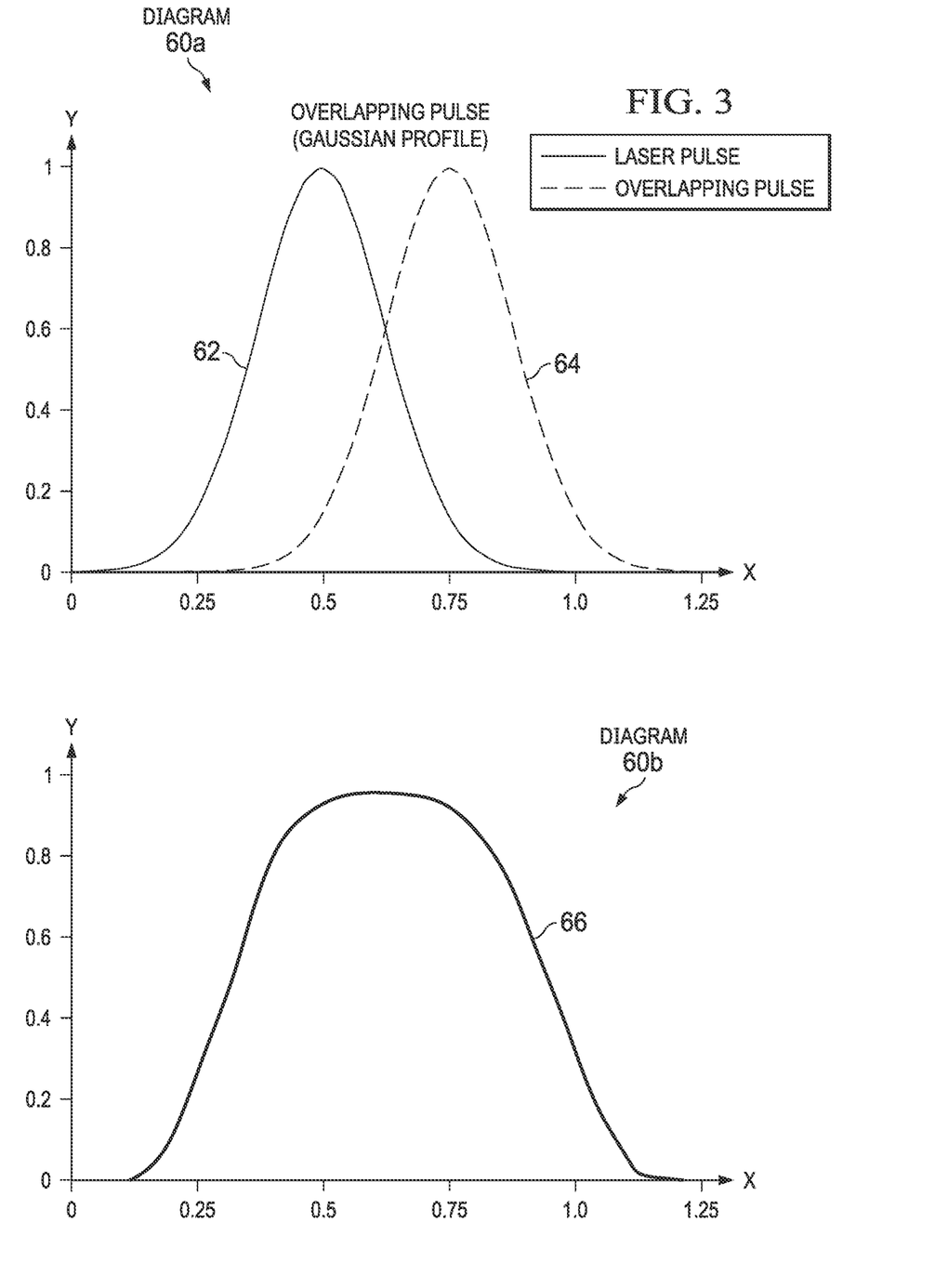
FIG. 3 illustrates an example of allowable overlapping shots.

(1) Overlapping Shots. Certain partially overlapping shots may be allowed, as described with reference to FIG. 3. FIG. 3 illustrates diagrams 60 (60a, 60b) of an example of allowable overlapping shots (or pulses). Diagram 60a shows the Gaussian profiles of the energies 62, 64 of overlapping shots, and diagram 60b shows the Gaussian profile of the combined energy 66 of the shots. The x-axis represents the relative pulse width, where one unit represents the pulse width of a single pulse. The y-axis represents the relative pulse energy, where one unit represents the pulse energy of a single pulse.

Any suitable definition of allowability may be used. In certain embodiments, the overlapping shots may be allowed if the maximum energy of the combined energy 66 is less than a predetermined maximum energy. Examples of a predetermined maximum energy include the maximum of: the energy of one of the overlapping pulses, the average energy of the overlapping pulses, or the average energy of the pulses of the laser device. In other embodiments, the overlapping shots may be allowed if the maximum energy of the combined energy 66 is less than a specified energy.

In the illustrated example, the overlapping shots may be allowed if the maximum energy of the combined energy 66 is less than the maximum energy of one of the overlapping shots. Diagrams 60 show that the maximum energy of the combined energy 66 is less than the maximum energy of one of the overlapping shots (which have the same maximum energy), so the shots are allowable.

Returning to FIG. 2, computer 30 may detect that overlapping laser shots of a substring yields a local shot frequency that fails to satisfy the maximum local frequency. If the overlapping laser shots are allowable, computer 30 may allow the substring. If the overlapping laser shots are not allowable, computer 30 may use additional techniques to adjust the shot list.

(2) Shifting the Shots. In certain embodiments, computer 30 may shift the laser shot to a later slot of the sequence until the local shot frequencies satisfy the maximum local frequency. For example, the overlapping shot is shifted to the next slot, i.e., shifted one slot, in the sequence, and rechecked to determine if it satisfies the maximum local frequency requirement for the treatment frequency. In other examples, the overlapping shot may be shifted two or more slots and then rechecked. This procedure may need to be repeated for multiple iterations until the maximum local frequency requirement is satisfied. An example of shifting shots is described in more detail with reference to TABLES 1 through 4 and FIG. 4.

TABLES 1 through 6 describe example shot lists. Each table includes columns for:

(1) Slot #: the time slot of a shot in a sequence;

(2) Frequency f: the treatment frequency at which pulses are emitted;

(3) Time to next shot: the time to the next shot, at the given treatment frequency;

(4) Delay to next allowed shot: time until the next shot is allowed for the same location as the shot of Slot 1;

(5) X and Y: x and y coordinates (x, y) of the shot; and (6) Comment: comments about the shots in the slot.

Figure 4:
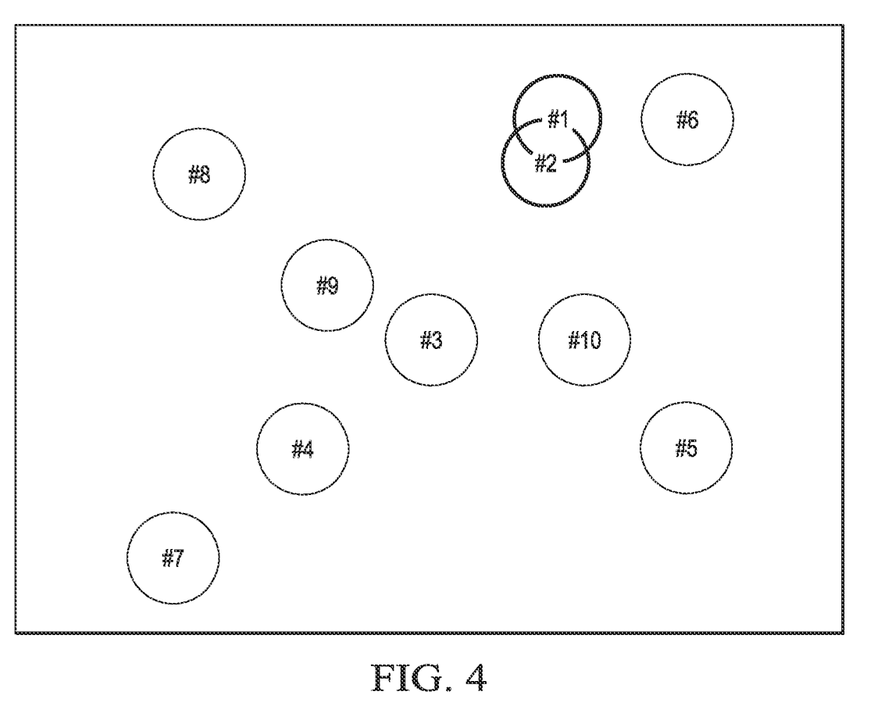
FIG. 4 illustrates an example of overlapping shots of a shot list.

FIG. 4 illustrates an example of overlapping shots of the shot list of TABLE 1. Overlapping may be determined in any suitable manner. For example, the distance between the (x,y) locations of the shots may be calculated. If the distance is less than a predetermined value (e.g., the diameter of the spot size of a shot), the shots may be considered overlapping. In the examples, the x and y units are, e.g., 100 microns, and the spot size is, e.g., approximately 1000 microns, i.e., 10 units. Accordingly, shots may be regarded as overlapping if the distance between the shots is less than 10 units.

TABLE 1 and FIG. 4 show overlapping shots (10, 20) in Slot 1 and (9, 16) in Slot 2.

TABLE 1

| Slot # | Frequency f [Hz] | Time to next shot [ms] | Delay to next allowed shot [ms] | X | Y | Comment |
| --- | --- | --- | --- | --- | --- | --- |
| 1 | 200 | 5 | 25 | 10 | 20 | |
| 2 | 200 | 5 | 20 | 9 | 16 | Overlapping shots |
| 3 | 200 | 5 | 15 | 0 | 0 | |
| 4 | 100 | 10 | 10 | −10 | −10 | Frequency change |
| 5 | 100 | 10 | 0 | 20 | −10 | |
| 6 | 100 | 10 | −10 | 20 | 20 | |
| 7 | 100 | 10 | −20 | −20 | −20 | |
| 8 | 100 | 10 | −30 | −18 | 15 | |
| 9 | 100 | 10 | −40 | −8 | 5 | |
| 10 | 100 | 10 | −50 | 12 | 0 | |

In TABLE 2, shot (9, 16) has been shifted from Slot 2 to Slot 3. However, shot (9, 16) still overlaps with shot (10, 20) in Slot 1.

TABLE 2

| Slot # | Frequency f [Hz] | Time to next shot [ms] | Delay to next allowed shot [ms] | X | Y | Comment |
|---|---|---|---|---|---|---|
| 1 | 200 | 5 | 25 | 10 | 20 | |
| 2 | 200 | 5 | 20 | 0 | 0 | |
| 3 | 200 | 5 | 15 | 9 | 16 | Shifted one slot, but still overlaps with (10, 20) |
| 4 | 100 | 10 | 10 | −10 | −10 | Frequency change |
| 5 | 100 | 10 | 0 | 20 | −10 | |
| 6 | 100 | 10 | −10 | 20 | 20 | |
| 7 | 100 | 10 | −20 | −20 | −20 | |
| 8 | 100 | 10 | −30 | −18 | 15 | |
| 9 | 100 | 10 | −40 | −8 | 5 | |
| 10 | 100 | 10 | −50 | 12 | 0 | |

In TABLE 3, shot (9, 16) has been shifted from Slot 3 to Slot 4. However, shot (9, 16) still overlaps with shot (10, 20) in Slot 1.

TABLE 3

| Slot # | Frequency f [Hz] | Time to next shot [ms] | Delay to next allowed shot [ms] | X | Y | Comment |
|---|---|---|---|---|---|---|
| 1 | 200 | 5 | 25 | 10 | 20 | |
| 2 | 200 | 5 | 20 | 0 | 0 | |
| 3 | 200 | 5 | 15 | −10 | −10 | |
| 4 | 100 | 10 | 10 | 9 | 16 | Frequency change Shifted two slots, but still overlaps with (10, 20) |
| 5 | 100 | 10 | 0 | 20 | −10 | |
| 6 | 100 | 10 | −10 | 20 | 20 | |
| 7 | 100 | 10 | −20 | −20 | −20 | |
| 8 | 100 | 10 | −30 | −18 | 15 | |
| 9 | 100 | 10 | −40 | −8 | 5 | |
| 10 | 100 | 10 | −50 | 12 | 0 | |

In TABLE 4, shot (9, 16) has been shifted from Slot 4 to Slot 5. Shot (9, 16) is now separated in time from shot (10, 20) in Slot 1 and does not overlap with the shots in Slots 3 or 4, so the substring is allowed.

TABLE 4

| Slot # | Frequency f [Hz] | Time to next shot [ms] | Delay to next allowed shot [ms] | X | Y | Comment |
|---|---|---|---|---|---|---|
| 1 | 200 | 5 | 25 | 10 | 20 | |
| 2 | 200 | 5 | 20 | 0 | 0 | Overlapping shots |
| 3 | 200 | 5 | 15 | −10 | −10 | |
| 4 | 100 | 10 | 10 | 20 | −10 | Frequency change |
| 5 | 100 | 10 | 0 | 9 | 16 | Shifted three slots, and is allowed |
| 6 | 100 | 10 | −10 | 20 | 20 | |
| 7 | 100 | 10 | −20 | −20 | −20 | |
| 8 | 100 | 10 | −30 | −18 | 15 | |
| 9 | 100 | 10 | −40 | −8 | 5 | |
| 10 | 100 | 10 | −50 | 12 | 0 | |

(3) Suspending the Shots. In certain embodiments, computer 30 may suspend the laser shot until the local shot frequencies satisfy the maximum local frequency. For example, the overlapping shot is suspended throughout the delay to the next allowed shot.

TABLE 5 lists overlapping shots (10, 20) in Slot 1 and (9, 16) in Slot 2.

TABLE 5

| Slot # | Frequency f [Hz] | Time to next shot [ms] | Delay to next allowed shot [ms] | X | Y | Comment |
|---|---|---|---|---|---|---|
| 1 | 200 | 5 | 25 | 10 | 20 | |
| 2 | 200 | 5 | 20 | 9 | 16 | Overlapping shots |
| 3 | 200 | 5 | 15 | 0 | 0 | |
| 4 | 100 | 10 | 10 | −10 | −10 | Frequency change |
| 5 | 100 | 10 | 0 | 20 | −10 | |
| 6 | 100 | 10 | −10 | 20 | 20 | |
| 7 | 100 | 10 | −20 | −20 | −20 | |
| 8 | 100 | 10 | −30 | −18 | 15 | |
| 9 | 100 | 10 | −40 | −8 | 5 | |
| 10 | 100 | 10 | −50 | 12 | 0 | |

In TABLE 6, Slot 2 with shot (9, 16) has been suspended until the next allowed slot. Shot (9, 16) is now separated in time from shot (10, 20) in Slot 1, so the substring is allowed.

TABLE 6

| Slot # | Frequency f [Hz] | Time to next shot [ms] | Delay to next allowed shot [ms] | X | Y | Comment |
|---|---|---|---|---|---|---|
| 1 | 200 | 5 | 25 | 10 | 20 | |
| — | — | — | 20 | — | — | Suspend shot |
| — | — | — | 15 | — | — | Suspend shot |
| — | — | — | 10 | — | — | Suspend shot |
| — | — | — | 5 | — | — | Suspend shot |
| 2 | 200 | 5 | 0 | 9 | 16 | |
| 3 | 200 | 5 | −5 | 0 | 0 | |
| 4 | 100 | 10 | −10 | −10 | −10 | Frequency change |
| 5 | 100 | 10 | −20 | 20 | −10 | |
| 6 | 100 | 10 | −30 | 20 | 20 | |
| 7 | 100 | 10 | −40 | −20 | −20 | |
| 8 | 100 | 10 | −50 | −18 | 15 | |
| 9 | 100 | 10 | −60 | −8 | 5 | |
| 10 | 100 | 10 | −70 | 12 | 0 | |

Regarding shifting versus suspending shots, shifting shots involves checking if the shifted shot overlaps with other shots in the substring, but suspending shots does not require checking since there are no laser shots while shots are suspended. Accordingly, shifting shots typically requires more computing resources. However, suspending shots delays the completion of the shot list, which may extend the duration of the surgery.

Figure 5:
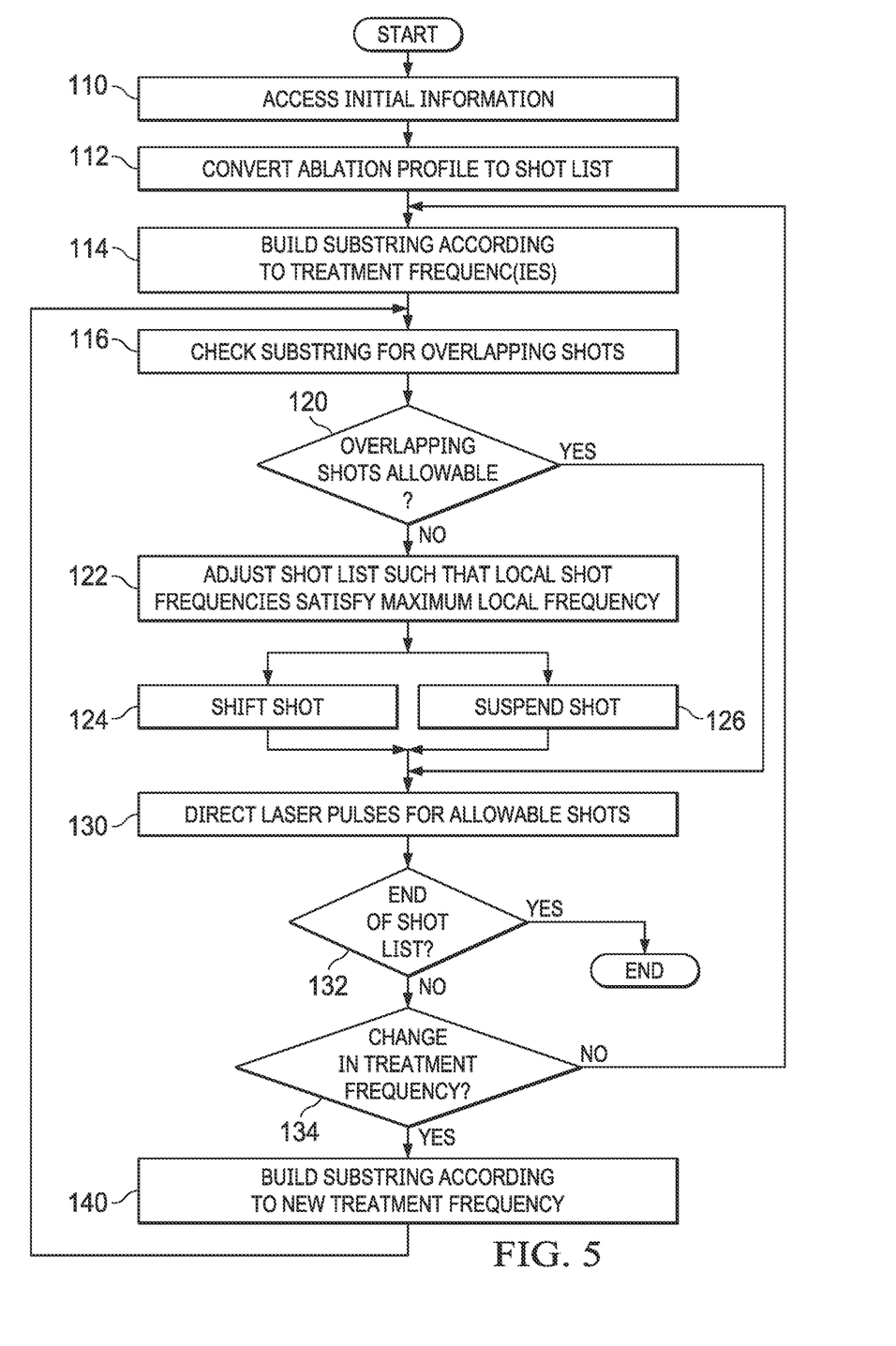
FIG. 5 illustrates an example of a method for adjusting a shot list for an ophthalmic surgical procedure that may be used by the system of FIG. 1, according to certain embodiments.

FIG. 5 illustrates an example of a method for adjusting a shot list for an ophthalmic surgical procedure that may be used by system 10 of FIG. 1, according to certain embodiments. In certain embodiments, laser device 15 directs laser pulses towards the eye at a treatment frequency, and computer 30 of system 10 performs certain steps of the method.

The method starts at step 110, where computer 30 accesses initial information describing the ophthalmic surgical procedure. The initial information may include, e.g., an ablation profile for a refractive ablation procedure. Computer 30 converts the ablation profile, which indicates the volume of tissue to be removed at x, y locations of the cornea, to a laser shot list at step 112. The shot list comprises a sequence of laser shots and their corresponding locations.

Computer 30 builds a substring from the shot list according to the treatment frequenc(ies) at step 114. The sequence of laser shots of the shot list comprises substrings, where each substring indicates a local shot frequency at a location. Each substring has a number of laser shots that depends on the treatment frequency. In certain embodiments, computer 30 may build substrings with multiple treatment frequencies. In other embodiments, computer 30 may limit substrings to a single treatment frequency. If the treatment frequency changes during building of a sub string, a new sub string is built for the next treatment frequency.

The substring is checked for overlapping shots at step 116. Overlapping shots may cause a local shot frequency to fail to satisfy the maximum local frequency if the overlapping shots are not allowable. At step 120, computer 30 checks whether the overlapping shots are allowable. If the overlapping shots are allowable, computer 30 does not change that part of the shot list, and the method proceeds to step 130, where laser device 15 directs laser shots for allowable shots. If the overlapping shots are not allowable, the method moves to step 122, where computer 30 adjusts the shot list such that the local shot frequencies satisfy the maximum local frequency at the treatment frequency.

Computer 30 may adjust the shot list at step 122 in any suitable manner, such as by performing steps 124, and/or 126 for the local shot frequency that causes the local frequency to fail to satisfy the maximum local frequency. Computer 30 shifts the overlapping shot to a next slot in the sequence at step 124, and computer 30 suspends the overlapping shot at step 126.

In certain embodiments, computer 30 may perform only the shifting of step 124 or only the suspending of step 126 for the duration of the method. In the embodiments, computer 30 shifts or suspends the overlapping shot until the local shot frequency satisfies the maximum local frequency at the treatment frequency. Shot suspension extends the duration of the method, so computer 30 may perform shot shifting to avoid extending the surgery. Shot shifting requires more computing power, so computer 30 may perform shot suspension to reduce computational needs.

In other embodiments, computer 30 may perform the shifting of step 124 and the suspending of step 126 at different iterations of adjusting the shot list. For example, computer 30 may select shot shifting or shot suspension in accordance with the treatment frequency. Higher treatment frequencies require checking substrings with a larger number of elements, which may require more computing resources. Accordingly, computer 30 may use shot suspension for higher treatment frequencies and shot shifting for lower treatment frequencies. Or, in other cases, computer 30 may use shot suspension for lower treatment frequencies and shot shifting for higher treatment frequencies.

In yet other embodiments, computer 30 may perform the shifting of step 124 and the suspending of step 126 during the same iteration of adjusting the shot list. For example, computer 30 may use shot shifting while adjusting a substring and then switch to shot suspension during the adjustment. In some cases, if shifting a shot one, two, or more slots does not make the sub string allowable, computer 30 may then suspend the shot to the next allowable slot. In other cases, computer may suspend the shot for a portion of the substring, and then shift the shot for the remainder of the substring.

Laser device 15 directs laser pulses towards the eye at step 130. The end of the shot list may be reached at step 132. If the end has not been reached at step 132, the method proceeds to step 134, where may be a change in the treatment frequency. If there is a change at step 134, the method proceeds to step 140, where computer 30 builds the next substring of the shot list according to the new treatment frequency. The method then returns to step 116 to check the substring built according to the new treatment frequency. If there is no change at step 134, the method returns to step 114, where computer 30 builds the next substring according to the current treatment frequency. If the end of the shot list has been reached at step 132, the method ends.

A component (such as control computer 30) of the systems and apparatuses disclosed herein may include an interface, logic, and/or memory, any of which may include computer hardware and/or software. An interface can receive input to the component and/or send output from the component, and is typically used to exchange information between, e.g., software, hardware, peripheral devices, users, and combinations of these. A user interface is a type of interface that a user can utilize to communicate with (e.g., send input to and/or receive output from) a computer. Examples of user interfaces include a display, Graphical User Interface (GUI), touchscreen, keyboard, mouse, gesture sensor, microphone, and speakers.

Logic can perform operations of the component. Logic may include one or more electronic devices that process data, e.g., execute instructions to generate output from input. Examples of such an electronic device include a computer, processor, microprocessor (e.g., a Central Processing Unit (CPU)), and computer chip. Logic may include computer software that encodes instructions capable of being executed by an electronic device to perform operations. Examples of computer software include a computer program, application, and operating system.

A memory can store information and may comprise tangible, computer-readable, and/or computer-executable storage medium. Examples of memory include computer memory (e.g., Random Access Memory (RAM) or Read Only Memory (ROM)), mass storage media (e.g., a hard disk), removable storage media (e.g., a Compact Disk (CD) or Digital Video or Versatile Disk (DVD)), database, network storage (e.g., a server), and/or other computer-readable media. Particular embodiments may be directed to memory encoded with computer software.

Although this disclosure has been described in terms of certain embodiments, modifications (such as changes, substitutions, additions, omissions, and/or other modifications) of the embodiments will be apparent to those skilled in the art. Accordingly, modifications may be made to the embodiments without departing from the scope of the invention. For example, modifications may be made to the systems and apparatuses disclosed herein. The components of the systems and apparatuses may be integrated or separated, or the operations of the systems and apparatuses may be performed by more, fewer, or other components, as apparent to those skilled in the art. As another example, modifications may be made to the methods disclosed herein. The methods may include more, fewer, or other steps, and the steps may be performed in any suitable order, as apparent to those skilled in the art.

To aid the Patent Office and readers in interpreting the claims, Applicants note that they do not intend any of the claims or claim elements to invoke 35 U.S.C. § 112(f), unless the words "means for" or "step for" are explicitly used in the particular claim. Use of any other term (e.g., "mechanism," "module," "device," "unit," "component," "element," "member," "apparatus," "machine," "system," "processor," or "controller") within a claim is understood by the applicants to refer to structures known to those skilled in the relevant art and is not intended to invoke 35 U.S.C. § 112(f).

What is claimed:

1. An ophthalmic surgical system for treating an eye, comprising:
   a laser device configured to:
      direct a plurality of laser pulses towards the eye according to a shot list, the laser pulses emitted at a treatment frequency, the shot list comprising a sequence of laser shots and their corresponding locations, the sequence of laser shots comprising a plurality of substrings, each substring indicating a local shot frequency at a location of a plurality of locations, each substring having a number of laser shots that depends on the treatment frequency; and
   a computer configured to:
      perform the following to build the plurality of substrings:
         build the plurality of substrings from the shot list according to the treatment frequency; and
         if there is a change in the treatment frequency, adjust the number of laser shots in a substring according to the change in the treatment frequency; and
      perform the following for each substring of the plurality of substrings:
         check whether the each substring indicates that a local shot frequency satisfies a maximum local frequency at the treatment frequency, the maximum local frequency limiting a frequency of shots at a location; and
         if the local shot frequency fails to satisfy the maximum local frequency at the treatment frequency, adjust the shot list such that the local shot frequency satisfies the maximum local frequency at the treatment frequency.

2. The ophthalmic surgical system of claim 1, the computer further configured to check whether the each substring indicates that a local shot frequency satisfies a maximum local frequency at the treatment frequency by:
   determining whether a plurality of overlapping laser shots of the substring are allowable; and
   if the overlapping laser shots are allowable, determining that the local shot frequency satisfies the maximum local frequency at the treatment frequency.

3. The ophthalmic surgical system of claim 2, the overlapping laser shots are allowable if a maximum energy of a combined energy of the overlapping laser shots is less than a maximum energy of an energy of a laser shot of the overlapping laser shots.

4. The ophthalmic surgical system of claim 1, the computer configured to adjust the shot list such that the local shot frequency satisfies the maximum local frequency at the treatment frequency by:
   identifying a laser shot that causes the local shot frequency to fail to satisfy the maximum local frequency; and
   shifting the laser shot to a later slot of the sequence until the local shot frequency satisfies the maximum local frequency.

5. The ophthalmic surgical system of claim 4, the computer configured to shift the laser shot to a later slot of the sequence until the local shot frequency satisfies the maximum local frequency by repeating the following until the local shot frequency satisfies the maximum local frequency:
   shift the laser shot to a next slot of the sequence; and
   check whether the local shot frequency satisfies the maximum local frequency.

6. The ophthalmic surgical system of claim 1, the computer configured to adjust the shot list such that the local shot frequency satisfies the maximum local frequency at the treatment frequency by:
   identifying a laser shot that causes the local shot frequency to fail to satisfy the maximum local frequency; and
   suspending the laser shot until the local shot frequency satisfies the maximum local frequency.

7. The ophthalmic surgical system of claim 6, the computer configured to suspend the laser shot until the local shot frequency satisfies the maximum local frequency by:
   suspending the laser shot to a next allowed slot.

8. The ophthalmic surgical system of claim 1, the computer configured to adjust the shot list such that the local shot frequency satisfies the maximum local frequency at the treatment frequency by:
   identifying a laser shot that causes the local shot frequency to fail to satisfy the maximum local frequency; and
   shifting or suspending the laser shot to a later slot of the sequence until the local shot frequency satisfies the maximum local frequency.

9. The ophthalmic surgical system of claim 8, the computer configured to shift or suspend the laser shot to a later slot of the sequence until the local shot frequency satisfies the maximum local frequency by:
   shifting the laser shot for a lower treatment frequency; and
   suspending the laser shot for a higher treatment frequency.

10. The ophthalmic surgical system of claim 8, the computer configured to shift or suspend the laser shot to a later slot of the sequence until the local shot frequency satisfies the maximum local frequency by:
    shifting the laser shot for a higher treatment frequency; and
    suspending the laser shot for a lower treatment frequency.

11. The ophthalmic surgical system of claim 8, the computer configured to shift or suspend the laser shot to a later slot of the sequence until the local shot frequency satisfies the maximum local frequency by:
    shifting the laser shot to a later slot of the substring; and
    suspending the laser shot until the local shot frequency satisfies the maximum local frequency.

12. The ophthalmic surgical system of claim 8, the computer configured to shift or suspend the laser shot to a later slot of the sequence until the local shot frequency satisfies the maximum local frequency by:
    suspending the laser shot until a later slot of the substring; and
    shifting the laser shot until the local shot frequency satisfies the maximum local frequency.

13. The ophthalmic surgical system of claim 1, further comprising a camera configured to record a plurality of images of the eye to monitor the treatment of the eye.

14. A method for treating an eye, comprising:
    directing, by a laser device, a plurality of laser pulses towards the eye according to a shot list, the laser pulses emitted at a treatment frequency, the shot list comprising a sequence of laser shots and their corresponding locations, the sequence of laser shots comprising a plurality of substrings, each substring indicating a local shot frequency at a location of a plurality of locations, each substring having a number of laser shots that depends on the treatment frequency;

performing, by a computer, the following to build the plurality of substrings:
build the plurality of substrings from the shot list according to the treatment frequency; and
if there is a change in the treatment frequency, adjust the number of laser shots in a substring according to the change in the treatment frequency; and performing, by the computer, the following for each substring of the plurality of substrings:
check whether the each substring indicates that a local shot frequency satisfies a maximum local frequency at the treatment frequency, the maximum local frequency limiting a frequency of shots at a location; and
if the local shot frequency fails to satisfy the maximum local frequency at the treatment frequency, adjust the shot list such that the local shot frequency satisfies the maximum local frequency at the treatment frequency.

15. The method of claim 14, the checking whether the each substring indicates that a local shot frequency satisfies a maximum local frequency at the treatment frequency further comprising:
determining whether a plurality of overlapping laser shots of the substring are allowable; and
if the overlapping laser shots are allowable, determining that the local shot frequency satisfies the maximum local frequency at the treatment frequency.

16. The method of claim 15, the overlapping laser shots are allowable if a maximum energy of a combined energy of the overlapping laser shots is less than a maximum energy of an energy of a laser shot of the overlapping laser shots.

17. The method of claim 14, the adjusting the shot list such that the local shot frequency satisfies the maximum local frequency at the treatment frequency further comprising:
identifying a laser shot that causes the local shot frequency to fail to satisfy the maximum local frequency; and
shifting the laser shot to a later slot of the sequence until the local shot frequency satisfies the maximum local frequency.

18. The method of claim 17, the shifting the laser shot to a later slot of the sequence until the local shot frequency satisfies the maximum local frequency further comprising repeating the following until the local shot frequency satisfies the maximum local frequency:
shifting the laser shot to a next slot of the sequence; and
checking whether the local shot frequency satisfies the maximum local frequency.

19. The method of claim 14, the adjusting the shot list such that the local shot frequency satisfies the maximum local frequency at the treatment frequency further comprising:
identifying a laser shot that causes the local shot frequency to fail to satisfy the maximum local frequency; and
suspending the laser shot until the local shot frequency satisfies the maximum local frequency.

20. The method of claim 19, the suspending the laser shot until the local shot frequency satisfies the maximum local frequency further comprising:
suspending the laser shot to a next allowed slot.

21. An ophthalmic surgical system for treating an eye, comprising:
a laser device configured to:
direct a plurality of laser pulses towards the eye according to a shot list, the laser pulses emitted at a treatment frequency, the shot list comprising a sequence of laser shots and their corresponding locations, the sequence of laser shots comprising a plurality of substrings, each substring indicating a local shot frequency at a location of a plurality of locations, each substring having a number of laser shots that depends on the treatment frequency;
a camera configured to record a plurality of images of the eye to monitor treatment of the eye; and
a computer configured to:
perform the following to build the plurality of substrings:
build the plurality of substrings from the shot list according to the treatment frequency; and
if there is a change in the treatment frequency, adjust the number of laser shots in a substring according to the change in the treatment frequency; and
perform the following for each substring of the plurality of substrings:
check whether the each substring indicates that a local shot frequency satisfies a maximum local frequency at the treatment frequency, the maximum local frequency limiting a frequency of shots at a location, the checking comprising determining whether a plurality of overlapping laser shots of the substring are allowable and determining that the local shot frequency satisfies the maximum local frequency at the treatment frequency if the overlapping laser shots are allowable, the overlapping laser shots allowable if a maximum energy of a combined energy of the overlapping laser shots is less than a maximum energy of an energy of a laser shot of the overlapping laser shots; and
if the local shot frequency fails to satisfy the maximum local frequency at the treatment frequency, adjust the shot list such that the local shot frequency satisfies the maximum local frequency at the treatment frequency, the computer configured to adjust the shot list by performing one of the following:
identifying a laser shot that causes the local shot frequency to fail to satisfy the maximum local frequency and shifting the laser shot to a later slot of the sequence until the local shot frequency satisfies the maximum local frequency, the laser shot shifted by repeating the following until the local shot frequency satisfies the maximum local frequency: shift the laser shot to a next slot of the sequence; and check whether the local shot frequency satisfies the maximum local frequency;
identifying a laser shot that causes the local shot frequency to fail to satisfy the maximum local frequency and suspending the laser shot to a next allowed slot until the local shot frequency satisfies the maximum local frequency; or
identifying a laser shot that causes the local shot frequency to fail to satisfy the maximum local frequency, and shifting or suspending the laser shot to a later slot of the sequence until the local shot frequency satisfies the maximum local frequency, the laser shot shifted or suspended by performing one of the following:

shifting the laser shot for a lower treatment frequency and suspending the laser shot for a higher treatment frequency;

shifting the laser shot for a higher treatment frequency and suspending the laser shot for a lower treatment frequency;

shifting the laser shot to a later slot of the substring and suspending the laser shot until the local shot frequency satisfies the maximum local frequency; or suspending the laser shot until a later slot of the substring and shifting the laser shot until the local shot frequency satisfies the maximum local frequency.

\* \* \* \* \*